United States Patent
Creusot et al.

(10) Patent No.: US 10,943,134 B2
(45) Date of Patent: Mar. 9, 2021

(54) BULB DISAMBIGUATION FOR TRAFFIC LIGHTS DISPOSED WITHIN A REGION OF INTEREST

(71) Applicant: GM GLOBAL TECHNOLOGY OPERATIONS LLC, Detroit, MI (US)

(72) Inventors: Clement Creusot, San Francisco, CA (US); Sarthak Sahu, Palo Alto, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 168 days.

(21) Appl. No.: 16/118,636

(22) Filed: Aug. 31, 2018

(65) Prior Publication Data
US 2020/0074194 A1    Mar. 5, 2020

(51) Int. Cl.
*G06K 9/00* (2006.01)
*G06K 9/32* (2006.01)
*G05D 1/02* (2020.01)
*G05D 1/00* (2006.01)

(52) U.S. Cl.
CPC ....... *G06K 9/00825* (2013.01); *G05D 1/0088* (2013.01); *G05D 1/0246* (2013.01); *G06K 9/3241* (2013.01); *G05D 2201/0213* (2013.01)

(58) Field of Classification Search
CPC combination set(s) only.
See application file for complete search history.

(56) References Cited

U.S. PATENT DOCUMENTS

| | | | |
|---|---|---|---|
| 9,557,737 B1 | 1/2017 | Ferguson et al. | |
| 9,690,297 B1 | 6/2017 | Ferguson et al. | |
| 9,892,332 B1 | 2/2018 | Wendel et al. | |
| 10,032,085 B2 | 7/2018 | Raghu et al. | |
| 2017/0024622 A1* | 1/2017 | Mizutani | G06K 9/00825 |
| 2018/0218226 A1* | 8/2018 | Wellington | G06K 9/00818 |

* cited by examiner

*Primary Examiner* — Alan D Hutchinson
*Assistant Examiner* — Andy Schneider
(74) *Attorney, Agent, or Firm* — Medley, Behrens & Lewis, LLC (57) ABSTRACT

A disambiguation system for an autonomous vehicle is described herein that disambiguates a traffic light framed by a plurality of regions of interest. The autonomous vehicle includes a localization system that defines the plurality of regions of interest around traffic lights captured in a sensor signal and provides an input to a disambiguation system. When the captured traffic lights are in close proximity, the plurality of regions of interest overlap each other such that a traffic light disposed in the overlapping region is ambiguous to an object detector because it is framed by more than one region of interest. A disambiguation system associates the traffic light with the correct region of interest to disambiguate a relationship thereof and generates a disambiguated directive for controlling the autonomous vehicle. Disambiguation can be achieved according to any of an edge-based technique, a vertex-based technique, and a region of interest distance-based technique.

20 Claims, 7 Drawing Sheets

BULB DISAMBIGUATION FOR TRAFFIC LIGHTS DISPOSED WITHIN A REGION OF INTEREST

BACKGROUND

An autonomous vehicle is a motorized vehicle that can operate without a human driver. An exemplary autonomous vehicle includes a plurality of sensor systems, such as, but not limited to, a camera sensor system, a lidar sensor system, a radar sensor system, amongst others, wherein the autonomous vehicle operates based upon sensor signals output by the sensor systems. Typically, sensor signals are provided to a computing system in communication with the plurality of sensor systems, wherein the sensor signals capture traffic lights in proximity to the autonomous vehicle. The sensor signals are processed by the computing system and, based upon detection of a traffic light captured in the sensor signal, the processor executes instructions to control a mechanical system of the autonomous vehicle (e.g., a vehicle propulsion system, a braking system, or a steering system).

In order to detect a traffic light, however, a sensor signal is provided to a localization system that defines a region of interest of the sensor signal, wherein the region of interest frames the traffic light captured in the sensor signal. For example, the sensor signal may be an image generated by a camera sensor system where the region of interest frames the traffic light in the image. The region of interest is defined by the localization system to be larger than the traffic light that it frames so that the region of interest includes a tolerance for map calibration and localization errors. Thus, a traffic light having a height of one meter may be boxed/framed in pixel space by a region of interest that corresponds to a height of three meters. When a plurality of traffic lights are captured in a sensor signal, the localization system defines a plurality of regions of interest that frame each of the plurality of traffic lights.

In instances where two or more traffic lights are mounted on a same pole or positioned in close proximity to one another, the regions of interest corresponding to each of the traffic lights may overlap such that one or all of the regions of interest frame part or all of at least two traffic lights. Accordingly, an object perception system that receives an output of the localization system cannot accurately identify the configuration of a first traffic light from its corresponding region of interest because an extraneous similar object, such as an illuminated bulb of a second traffic light, is disposed within the same region of interest as the first traffic light. Thus, an object detector included in the object perception system may erroneously identify a configuration of the first traffic light based upon detection of the additional bulb from the second traffic light, resulting in generation of an erroneous directive to control the autonomous vehicle.

SUMMARY

The following is a brief summary of subject matter that is described in greater detail herein. This summary is not intended to be limiting as to the scope of the claims.

Described herein are various technologies pertaining to disambiguation of a traffic lights disposed within a region of interest. With more specificity, described herein are various technologies pertaining to disambiguating illuminated bulbs of traffic light(s) captured in a region of interest to improve the accuracy of a generated directive for controlling an autonomous vehicle. With still more specificity, described herein is a localization system that defines a region of interest of a sensor signal, wherein the region of interest frames an ambiguous bulb of a traffic light captured in the sensor signal, and the localization system provides an input to a disambiguation system to disambiguate a relationship between the region of interest and the framed traffic light. An output of the disambiguation system is thereby generated for controlling a mechanical system of the autonomous vehicle, such as a vehicle propulsion system, a braking system, and/or a steering system. With yet more specificity, the disambiguation system incorporates at least one of an edge-based module, a vertex based module, or a region of interest distance-based module to define a disambiguated output of the disambiguation system.

A disambiguation system can confirm traffic light configurations when map calibration and localization are insufficient to perfectly frame a detected traffic light. In such instances, large/oversized regions of interest that frame different traffic lights captured in the same sensor signal (image) may overlap with one another, thereby providing cross-talk that results in generation of an erroneous directive when an object detector is executed on the regions of interest. Specifically, when detected traffic lights are in close proximity to each other, an illuminated bulb of a first traffic light may be disposed in a large region of interest of a second traffic light such that when an object detector is executed on the second region of interest the object detector may incorrectly associate the illuminated bulb of the first traffic light with the configuration of the second traffic light to define a directive thereof. Thus, the relationship between the region of interest and the framed traffic light in the overlapped portion is ambiguous to the object detector.

The disambiguation system is incorporated in the object perception system to disambiguate a framed traffic light and a region of interest to provide increased confidence that a detected traffic light has been correctly associated with its corresponding region of interest. In embodiments where a relationship between a plurality of regions of interest and a plurality of traffic lights is ambiguous, an object detector is executed on each region of interest separately to confirm that each of the plurality of traffic lights is correctly distributed. Accordingly, the disambiguation system is generally initiated by an output from the localization system that defines regions of interest which have an overlapping portion.

Disambiguation of a relationship between a region of interest and a traffic light framed therein, for instance, can be performed utilizing at least one of an edge-based technique, a vertex-based technique, or a region of interest distance-based technique to define an output of the disambiguation system. In an exemplary embodiment, a vertex-based module may define the output of the disambiguation system when an edge-based module fails to disambiguate the relationship between the region of interest and the framed traffic light; and a region of interest distance-based module may define the output of the disambiguation system when the vertex-based module fails to disambiguate the relationship between the region of interest and the framed traffic light.

The edge-based technique incorporates the notion that each detected traffic light/bulb includes an edge in which the edge-based module can define a first vector that extends from a first bulb to a second bulb. A second vector is likewise defined by the edge-based module that extends from a point in a first region of interest to a corresponding point in a second region of interest. If the first vector and the second vector have the same magnitudes and directions, the disambiguation system pairs the origins and endpoints of the vectors to associate the traffic lights/bulbs with their correct region of interest (e.g., the first bulb and the first region of interest are indicated by the origins of the vectors and the second bulb and the second region of interest are indicated by the endpoints of the vectors). If the magnitudes and directions of the vectors do not match, an alternative disambiguation technique may be desirable.

The vertex-based technique defines an output of the disambiguation system by determining an orientation of the traffic lights. For example, if a first traffic light is detected by a vertex-based module as directly facing the sensor system at 0 degrees and a second traffic light is detected as being angled away from the sensor system at 30 degrees, where both the first traffic light and the second traffic light are framed by a same region of interest, it is more likely that the traffic light which directly faces the sensor system of the autonomous vehicle is the traffic light that corresponds to the surrounding region of interest. Thus, the disambiguation system may disambiguate the relationship between the region of interest and the framed traffic lights by detecting which traffic light exhibits the most visibility toward the sensor system.

Additionally, the relationship between the region of interest and the framed traffic light may be disambiguated by a region of interest distance-based technique that is based upon the distance to the traffic lights from a center of the region of interest. While the region of interest is defined to provide a tolerance for map calibration and localization errors, the localization system is configured to approximately centralize the region of interest around a detected traffic light. Thus, the closer a traffic light is to the center of the region of interest as defined by the localization system, the more likely it is that the region of interest corresponds to that traffic light.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 4A(i) is an exemplary graphical illustration of an edge-based disambiguation technique.

FIG. 4A(ii) is an exemplary graphical illustration of an edge-based disambiguation technique.

DETAILED DESCRIPTION

Various technologies pertaining to disambiguation of a traffic light disposed within a region of interest is now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B.

In addition, the articles "a" and "an" as used in this application and the appended claims should generally be construed to mean "one or more" unless specified otherwise or clear from the context to be directed to a singular form.

Further, as used herein, the terms "component", "module", and "system" are intended to encompass computer-readable data storage that is configured with computer-executable instructions that cause certain functionality to be performed when executed by a processor. The computer-executable instructions may include a routine, a function, or the like. It is also to be understood that a component, module, or system may be localized on a single device or distributed across several devices.

Further, as used herein, the term "exemplary" is intended to mean serving as an illustration or example of something and is not intended to indicate a preference.

As used herein, the term "disambiguation" refers to confirming that a bulb of a traffic light captured in a sensor signal is correctly associated with a region of interest that frames the traffic light.

Figure 1:
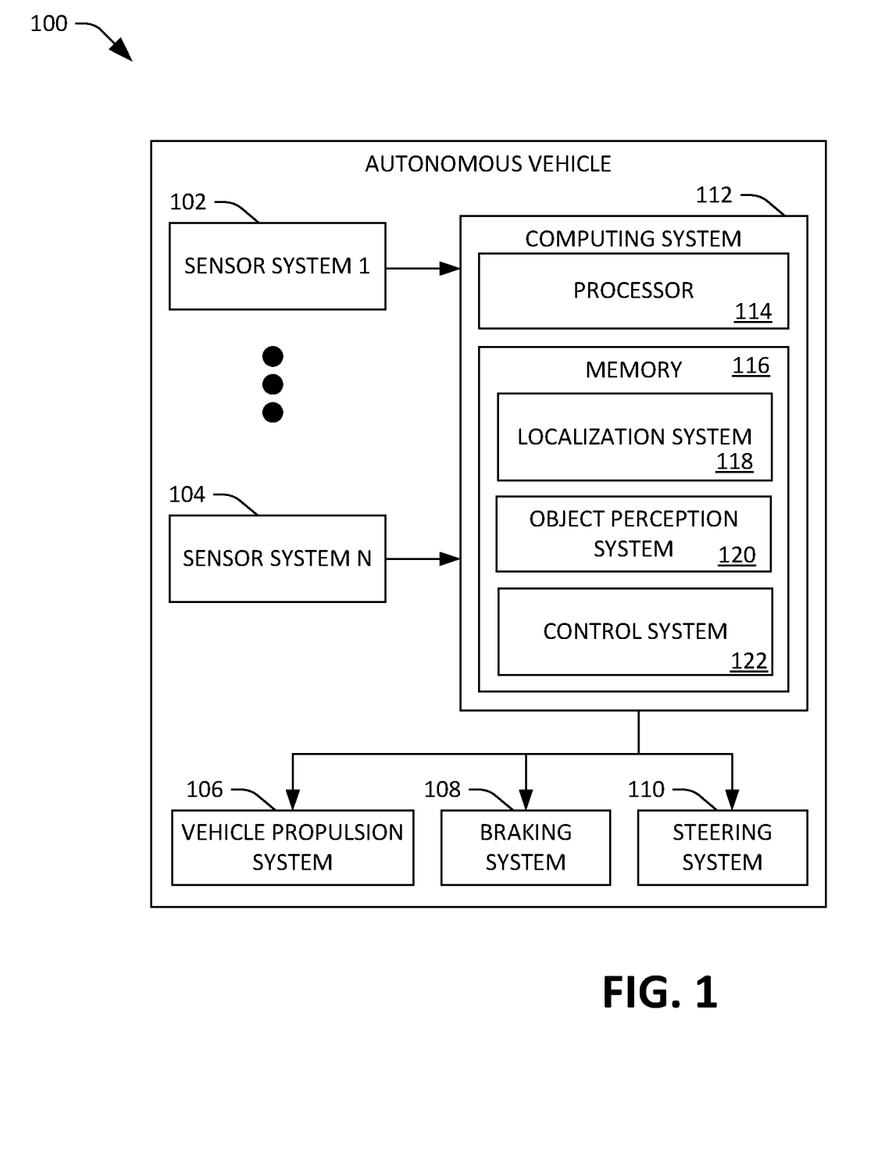
FIG. 1 illustrates an exemplary autonomous vehicle.

With reference now to FIG. 1, an exemplary autonomous vehicle 100 is illustrated. The autonomous vehicle 100 can navigate about roadways without human conduction based upon sensor signals output by sensor systems of the autonomous vehicle 100. The autonomous vehicle 100 includes a plurality of sensor systems 102-104 (a first sensor system 102 through an Nth sensor system 104). The sensor systems 102-104 are of different types and are arranged about the autonomous vehicle 100. For example, the first sensor system 102 may be a camera (image) sensor system and the Nth sensor system 104 may be a lidar system; or the sensor systems 102-104 may be of different types of a same kind of sensor system, such as different types of camera sensor systems (e.g., fixed exposure and autoexposure). Other exemplary sensor systems include radar sensor systems, global positioning system (GPS) sensor systems, infrared sensor systems, sonar sensor systems, and the like.

While conventional camera sensor systems have a viewing range on the order of 60 degrees, the incorporation of additional cameras to the autonomous vehicle 100 can increase the viewing range of a camera sensor system (e.g., one of the sensor systems 102-104) to 180 degrees and beyond, if desirable. Furthermore, some or all of the plurality of sensor systems 102-104 may comprise articulating sensors. An articulating sensor is a sensor that may be oriented (i.e., rotated) by the autonomous vehicle 100 such that a field of view of the articulating sensor may be directed towards different regions surrounding the autonomous vehicle 100.

The autonomous vehicle 100 further includes several mechanical systems that are used to effectuate appropriate motion of the autonomous vehicle 100. For instance, the mechanical systems can include but are not limited to, a vehicle propulsion system 106, a braking system 108, and a steering system 110. The vehicle propulsion system 106 may be an electric motor or an internal combustion engine. The braking system 108 can include an engine brake, brake pads, actuators, and/or any other suitable componentry that is configured to assist in decelerating the autonomous vehicle 100. The steering system 110 includes suitable componentry that is configured to control the direction of movement of the autonomous vehicle 100.

The autonomous vehicle 100 additionally comprises a computing system 112 that is in communication with the sensor systems 102-104 and is further in communication with the vehicle propulsion system 106, the braking system 108, and the steering system 110. The computing system 112 includes a processor 114 and memory 116 that includes computer-executable instructions that are executed by the processor 114. In an example, the processor 114 can be or include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), or the like.

The memory 116 comprises a localization system 118 that is configured to define a region of interest of a sensor signal (image) based upon a geometric projection between the sensor systems 102-104 and an object of interest, such as a traffic light. The region of interest frames the traffic light and is communicated from the localization system 118 to an object perception system 120 that is additionally incorporated in the memory 116. The object perception system 120 generates a directive for controlling the autonomous vehicle 100. The directive defines the most suitable course of action that an autonomous vehicle 100 should perform according to the detected configuration of a traffic light/lane and the applicable laws of the region. The memory 116 likewise includes a control system 120 that is configured to receive the directive from the object perception system 120 and is further configured to control at least one mechanical system (e.g., the vehicle propulsion system 106, the brake system 108, and/or the steering system 110) of the autonomous vehicle 100 based upon the directive output by the object perception system 120.

Figure 2:
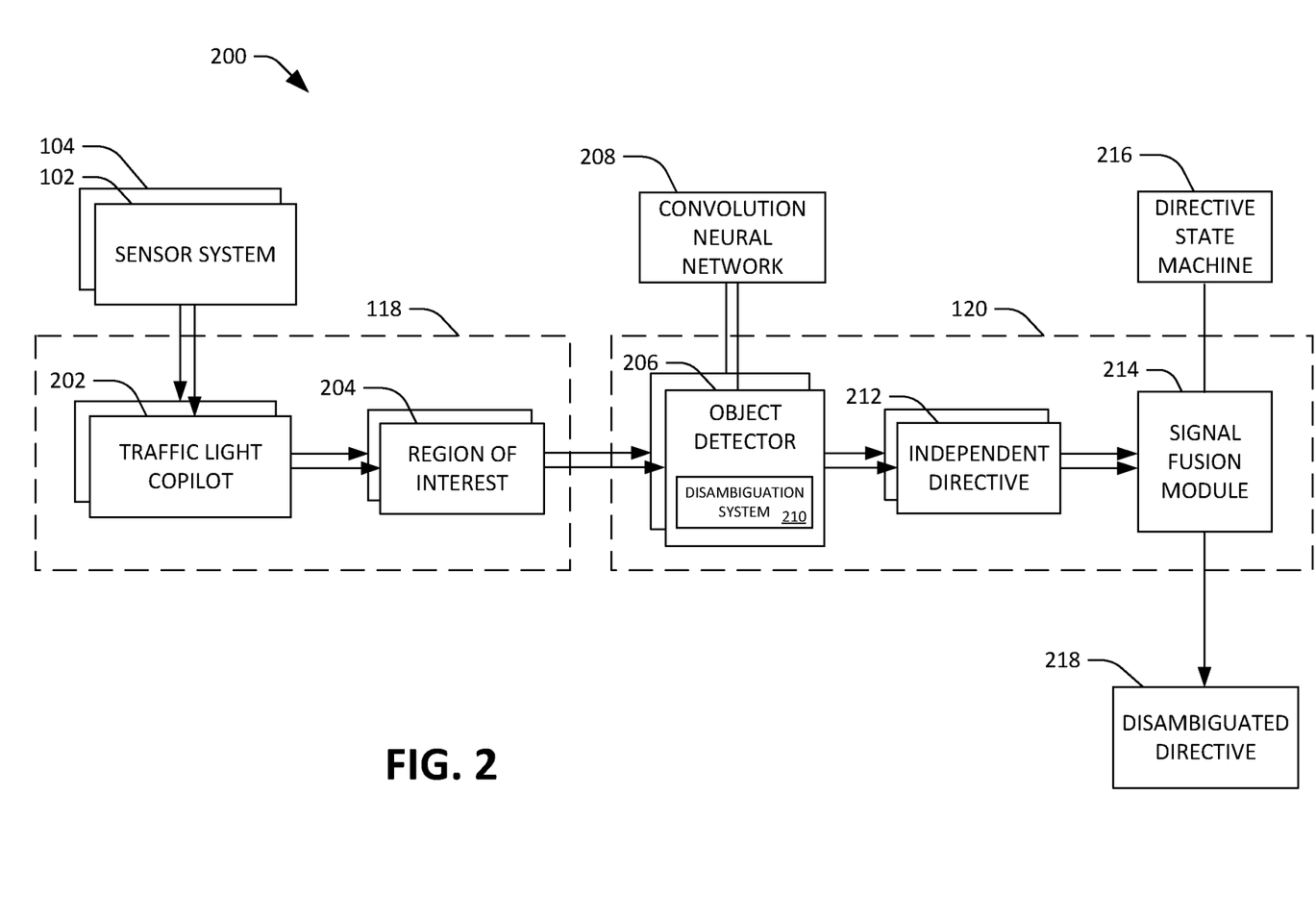
FIG. 2 illustrates an exemplary disambiguation system included in a computing system architecture that outputs a disambiguated directive to control an autonomous vehicle.

With reference now to FIG. 2, an architecture 200 is illustrated that includes a disambiguation system 210. The architecture 200 is implemented by the computing system 112 to output a disambiguated directive 218 for controlling the autonomous vehicle 100 based on at least one sensor signal input by the sensor systems 102-104. The sensor systems 102-104 may include a plurality of cameras, such as general-purpose cameras (fixed exposure) or high dynamic range (HDR) cameras (autoexposure), that provide a first sensor signal and a second sensor signal to the localization system 118. Thus, the architecture 200 illustrates a multi-modal system configured to generate a disambiguated directive 218 based on a plurality of sensor signal inputs.

The localization system 118 includes a traffic light copilot 202 and a region of interest module 204 disposed in signal communication between the sensor systems 102-104 and the object perception system 120. In an exemplary embodiment, the region of interest module 204 may be incorporated within the traffic light copilot 202. The traffic light copilot 202 defines a geometric projection that identifies where a traffic light is positioned relative to the sensor systems 102-104 of the autonomous vehicle 100. The output of the traffic light copilot 202 is provided to the region of interest module 204 to define a region of interest that frames a traffic light captured in the sensor signal (image). The region of interest comprises dimensions that are larger than the traffic light to provide a tolerance for map calibration and localization errors (e.g., the region of interest may correspond to a height of 4 meters when defined around a traffic light having a height of 1 meter).

The object perception system 120 receives the output of the localization system 118 and comprises an object detector module 206 that includes the disambiguation system 210. The object detector module 206 is adapted to detect the configuration of a traffic light framed within a region of interest to generate a directive based upon illuminated bulbs thereof. If two or more regions of interest of the sensor signal overlap one another and a traffic light is disposed within the overlapping portion of the two regions of interest, the disambiguation system 210 associates the traffic light with the correct region of interest.

The object detector module 206 can be, but is not limited to, an absolute detector which detects a kind of bulb that is illuminated, or a relative activation detector which determines the configuration of a traffic light based upon inferences about the layout of the traffic light. For example, if the top position of a vertically aligned three-bulb traffic light is illuminated, the relative activation detector may infer a "solid red circle" based upon a taxonomy of predefined layouts incorporated in the memory 116 to generate a directive. If a plurality of sensor signals are provided to the localization system 118 and further to the object perception system 120, the object detector module 206 can generate an independent directive 212 for each corresponding signal which are fused at a signal fusion module 214 to output the disambiguated directive 218. Each independent directive 212 provided to the signal fusion module 208 defines a (pre-fusion) vehicle maneuver that corresponds to the observed state of the traffic light detected by the object detector module 206 based on disambiguation of the traffic light with respect to a region of interest. If only one sensor signal is generated by the sensor systems 102-104, the signal fusion process is not necessary and the independent directive 212 is itself output as the disambiguated directive 218, which is thereby provided to the control system 122.

Additionally included in the architecture 200 is a convolution neural network 208 and a directive state machine 216. The convolution neural network 208 is linked to the object detector modules 206 to identify traffic light configurations in the region of interest that are framed by the region of interest module 204. In an exemplary embodiment, a plurality of convolutional neural networks 208 can be executed on a same sensor signal (image) to detect a plurality of traffic light configurations captured in the sensor signal. The directive state machine 216 is in communication with the object perception system 120. The directive state machine 216 is configured to define at least eight universal directives including: STOP (red light), STOP_AND_YIELD (flashing red light), MAYBE_STOP (yellow light), YIELD (flashing yellow light), ABOUT_TO_GO (light will soon turn green—transition directive in some countries), GO (green light), GO_PROTECTED (proceed through), and UNKNOWN (no detected light).

Figure 3:
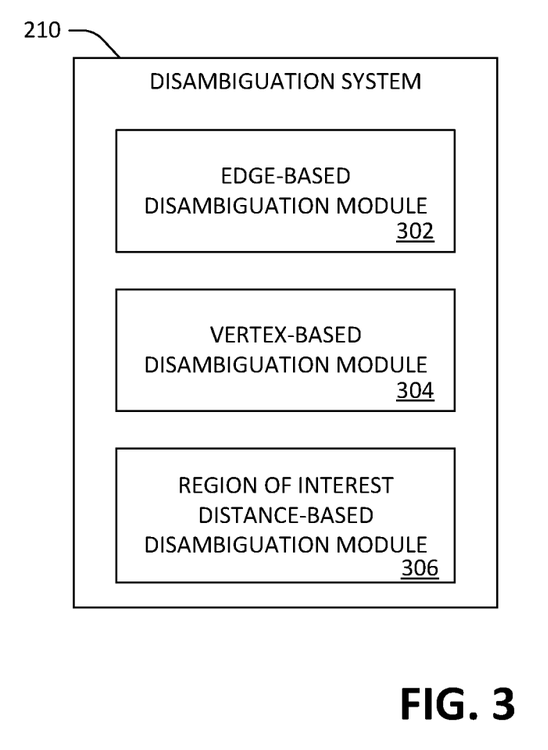
FIG. 3 illustrates an exemplary disambiguation system.

With reference now to FIG. 3, an exemplary disambiguation system 210 is illustrated. The disambiguation system 210 is initiated by the object detector module 206 to confirm that a traffic light captured in a sensor signal is associated with the correct region of interest. For example, a camera sensor system of the autonomous vehicle 100 may generate an image sensor signal that captures a plurality of traffic lights in a same image. The image is provided to the localization system 118 where a region of interest is defined around each of the plurality of traffic lights. Since a region of interest is configured to be larger than the traffic light that it frames, it is possible that two or more regions of interest may be arranged such that a portion of their boundaries overlap when two or more traffic lights are disposed in close proximity to each other. Accordingly, it is an output by the localization system 118 which defines overlapping regions of interest that generally triggers initiation of the disambiguation system 210 by the object detector module 206.

The disambiguation system 210 incorporates three modules that each define a graph matching technique for disambiguating the relationship between a region of interest and a traffic light framed therein. These modules include, but are not limited to, an edge-based disambiguation module 302, a vertex-based disambiguation module 304, and a region of interest distance-based disambiguation module 306. In an exemplary embodiment, the vertex-based module 304 is only initiated if the edge-based module 302 fails to disambiguate the traffic light and the region of interest distance-based module 306 is only initiated if the vertex-based module 304 fails to disambiguate the traffic light. In another exemplary embodiment, the edge-based module 302, the vertex-based module 304, and the region of interest distance-based module 306 are initiated independently of each other by the disambiguation system 210 to disambiguate the traffic light.

The edge-based module 302 disambiguates detected traffic lights by defining their relationship to a region of interest with vectors and comparing the magnitude and direction of the vectors to determine whether the vectors match. A match indicates that the origins of the vectors correspond to a first disambiguated relationship and the endpoints of the vectors correspond to a second disambiguated relationship. Vectors that have non-matching magnitudes and directions indicate that the origins and endpoints cannot be paired to disambiguate the relationship between the traffic lights and regions of interest and that an alternative graph matching technique may be desirable.

The vectors are defined by the edge-based module 302 such that a first vector extends from a first traffic light/bulb to a second traffic light/bulb and a second vector extends from a center of a first region of interest to a center of a second region of interest. If the magnitudes and directions of the vectors correspond, then the first bulb and the first region of interest are associated by the disambiguation system 210 based on the origins of the vectors and the second bulb and second region of interest are associated by the disambiguation system 210 based on the endpoints of the vectors. That is, if the vectors are of the same length (magnitude) and are oriented at the same angle (direction), the traffic lights can be disambiguated. Otherwise, the edge-based module 302 has not confirmed the relationship between the bulbs from the regions of interest based on disambiguation.

The vertex-based module 304 disambiguates detected traffic lights by determining an orientation of traffic lights framed within a region of interest. For instance, sensor systems 102-104 of the autonomous vehicle 100 may capture a plurality of traffic lights mounted on a same pole, wherein a first traffic light directly faces a lane occupied by the autonomous vehicle 100 and a second traffic light is disposed at an angle to the autonomous vehicle 100 to control the flow of traffic of a second lane. However, the orientation of the second traffic light is arranged such that an illuminated bulb thereof is framed by the region of interest corresponding to the first traffic light along with an illuminated bulb of the first traffic light. The vertex-based module 304 disambiguates the traffic lights by determining which bulb is most visibly captured in the sensor signal (image). Specifically, a bulb that faces the sensor system at 0 degrees has more visibility to the sensor system than a bulb disposed at a 30 degree angle and therefore provides increased confidence that the 0 degree facing bulb is associated with the region of interest. Accordingly, the vertex-based module 304 disambiguates the traffic lights based on their visibility to the sensor system.

The relationship between a region of interest and a framed traffic light may likewise be disambiguated by the region of interest distance-based module 306. The localization system 118 is configured to define a region of interest around a traffic light that approximately centers the traffic light within the region of interest. However, due to tolerance provided for map calibration and localization errors, the region of interest is oversized with respect to the traffic light in case the localization system 118 does not perfectly centralize the traffic light within the region of interest. Accordingly, the region of interest distance-based module 306 can provide increased confidence for disambiguation by determining a distance from the center of the region of interest to the traffic light. The more centralized that a traffic light is within a region of interest, the more likely it is that the traffic light corresponds to that region of interest. Thus, the region of interest distance-based module 306 determines the distance from a center of a region of interest to a plurality of traffic lights framed therein. The traffic light that is disposed closest to the center of the region of interest is disambiguated by being associated therewith.

Figure 4A:
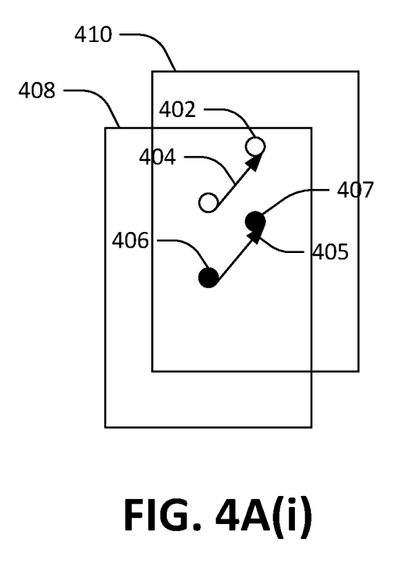
Figure 4B:
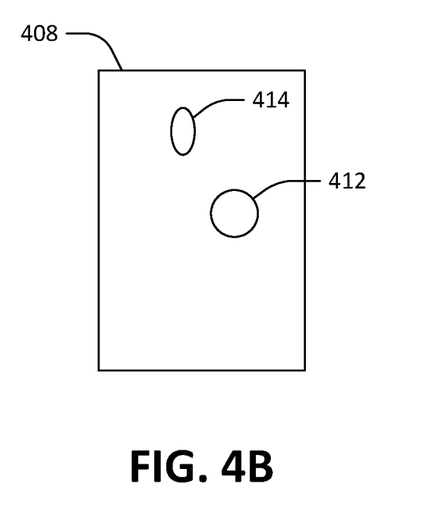
FIG. 4B is an exemplary graphical illustration of a vertex-based disambiguation technique.
Figure 4C:
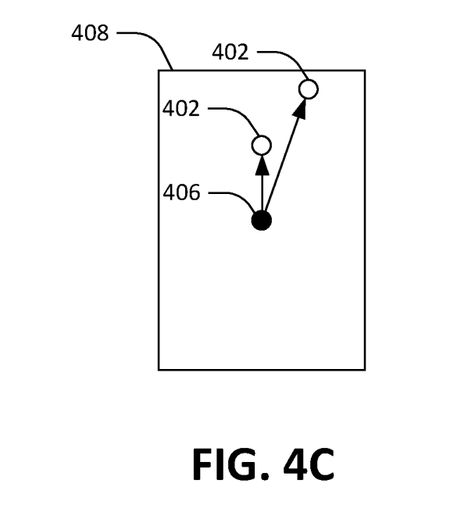
FIG. 4C is an exemplary graphical illustration of a region of interest distance-based disambiguation technique.

FIGS. 4A-4C illustrate the graph matching techniques performed by the edge-based module 302, the vertex-based module 304, and the region of interest distance-based module 306.

With reference now to FIG. 4A(i)-(ii), two configurations of overlapping regions of interest 408-410 are illustrated that correspond to the edge-based technique. A plurality of traffic lights 402 are framed by the regions of interest 408-410 in an overlapping portion thereof. A first center 406 corresponds to a first region of interest 408 and a second center 407 corresponds to a second region of interest 410. In both configurations, a first vector 404 extends from an edge of a first traffic light to an edge of a second traffic light and a second vector 405 extends from the first center 406 to the second center 407. In FIG. 4A(i), the magnitude and direction of the vectors 404-405 provide a match. Therefore, the edge-based module 302 disambiguates the plurality of traffic lights 402 and the regions of interest 408-410 by associating the origins of the vectors 404-405 with the first bulb and the first region of interest 408 and the endpoints of the vectors 404-405 with the second bulb and the second region of interest 410. In FIG. 4A(ii), the magnitudes and directions of the vectors 404-405 do not provide a match. Therefore, the edge-based technique does not disambiguate the plurality of traffic lights 402 and the regions of interest 408-410 in the second configuration.

With reference now to FIG. 4B, a graphical illustration of the vertex-based technique is shown. The region of interest 408 frames a plurality of traffic lights including a direct-facing bulb 412 oriented directly toward the sensor system and an angled bulb 414 disposed at a skewed orientation from the sensor system. As such, the visibility of the direct-facing bulb 412 is fully captured by the senor system, whereas the visibility of the angled bulb 414 is only partially captured by the sensor system. Accordingly, the vertex-based module 304 disambiguates the direct-facing bulb 412 by associating it with the region of interest 408 based on an orientation which directly faces the sensor system.

With reference now to FIG. 4C, a graphical illustration of the region of interest distance-based technique is shown. The region of interest 408 frames a plurality of traffic lights 402. A first distance is determined from the center 406 of the region of interest 408 to a first traffic light 402. Likewise, a second distance is determined from the center 406 to a second traffic light 402. The region of interest distance-based module 306 disambiguates the plurality of traffic lights 402 by associating the region of interest 408 with the traffic light 402 that is closer to the center 406 of the region of interest 408.

Figure 5:
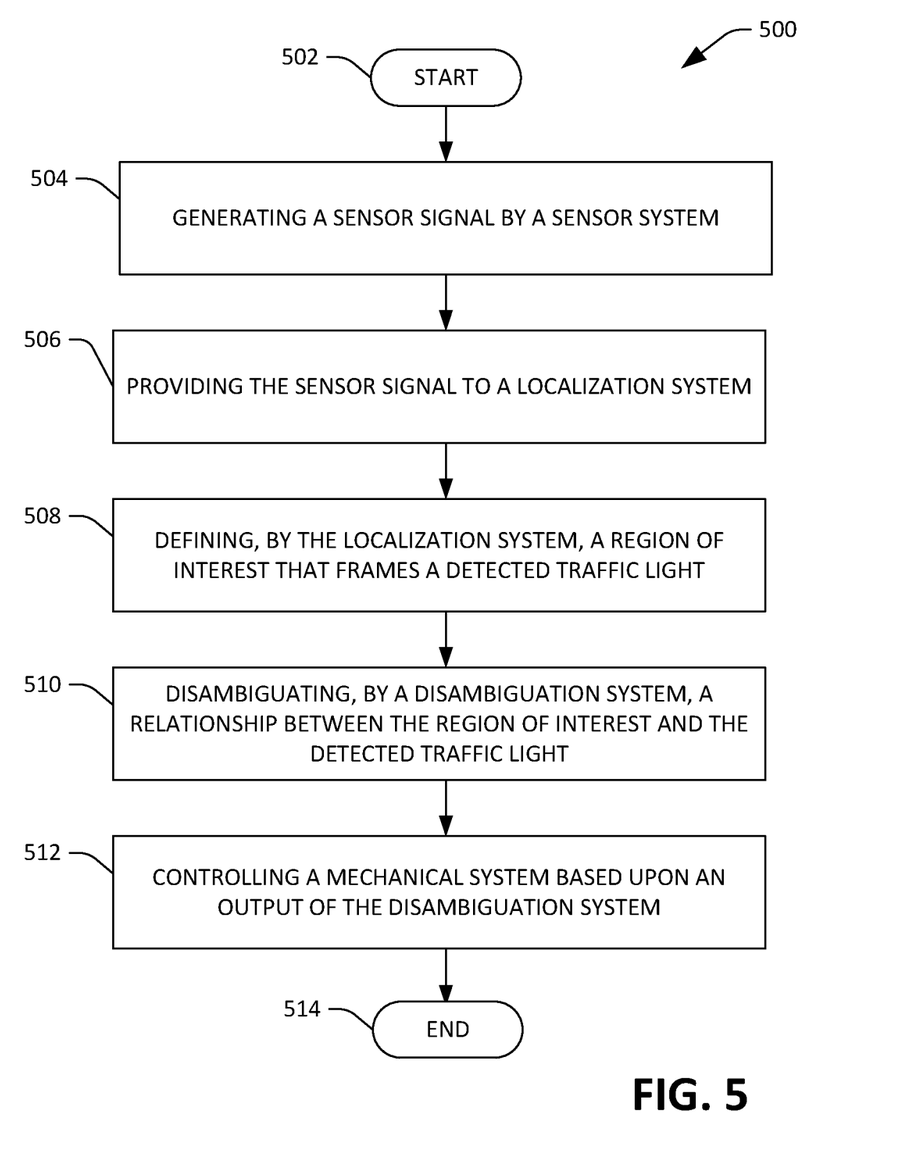
FIG. 5 is a flow diagram illustrating an exemplary methodology for controlling an autonomous vehicle based on disambiguation of a traffic light disposed within a region of interest.
Figure 6:
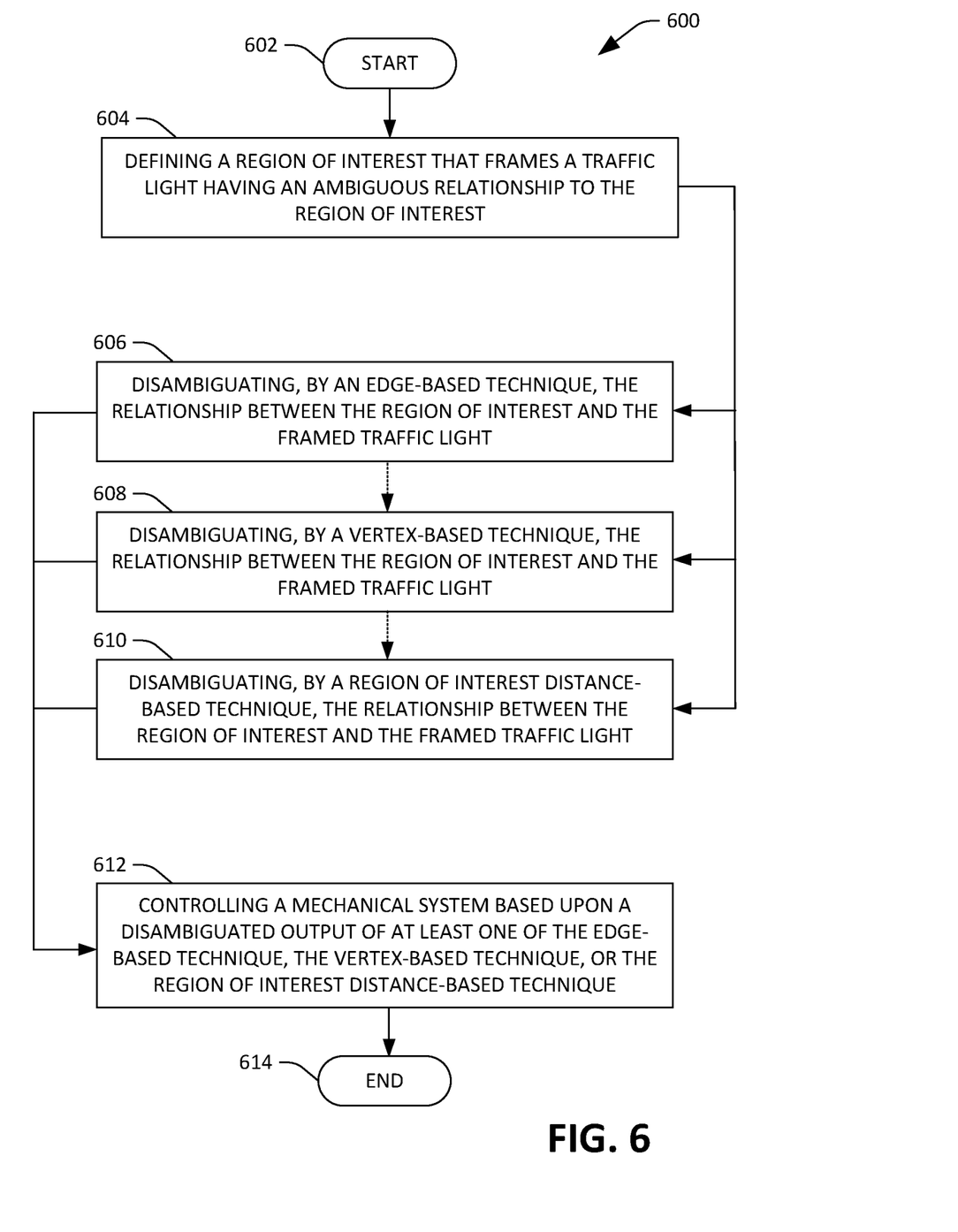
FIG. 6 is a flow diagram illustrating an exemplary methodology for controlling an autonomous vehicle based on disambiguation of a traffic light disposed within a region of interest.

FIGS. 5 and 6 illustrate exemplary methodologies relating to disambiguation of a traffic light disposed within a region of interest. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 5, an exemplary methodology 500 for disambiguating a traffic light disposed within a region of interest is illustrated. The methodology 500 starts at 502, and at 504 a sensor system generates a sensor signal that captures a traffic light. The sensor system may be a camera sensor system that generates an image which captures the configuration of a traffic light in proximity to an autonomous vehicle. At 506, the sensor signal is provided to a localization system. The localization system is configured to calibrate and localize the sensor signal (image) based upon geometric projections between the sensor system and a traffic light. At 508, the localization system defines a region of interest of the sensor signal that frames the traffic light captured in the sensor signal, wherein a relationship between the region of interest and the framed traffic light is ambiguous. For instance, the traffic light may be framed by a plurality of regions of interest that partially overlap, wherein the framed traffic light is disposed in the overlapped portion. At 510, a disambiguation system disambiguates the relationship between the region of interest and the framed traffic light to associate the framed traffic light with its corresponding region of interest, as defined by the localization system.

At 512, a mechanical system is controlled by a control system based upon an output of the disambiguation system. The output may be provided to the control system as a directive for the autonomous vehicle. The methodology 500 completes at 514.

Referring now to FIG. 6, an exemplary methodology 600 for disambiguating a traffic light disposed within a region of interest is illustrated. The methodology 600 starts at 602, and at 604 a region of interest is defined to frame a traffic light. The relationship between the region of interest and the framed traffic light is ambiguous. For instance, the traffic light may be framed by a plurality of regions of interest that partially overlap, wherein the framed traffic light is disposed in the overlapped portion. At 606-610, the relationship between the region of interest and the framed traffic light is disambiguated by at least one of an edge-based module, a vertex-based module, or a region of interest distance-based module of the disambiguation system. An output of the modules is used to define a directive for the autonomous vehicle based upon the detected configuration of the framed traffic light.

At 606, the edge-based module generates a disambiguated output by comparing a first vector extending from the framed traffic light to a second traffic light with a second vector extending from the region of interest to a second region of interest. At 608, the vertex-based module generates a disambiguated output by determining the orientation of the framed traffic light. At 610, the region of interest distance-based module generates a disambiguated output by determining a distance from the framed traffic light to a center of the region of interest. The modules at steps 606-610 may be independently initiated to disambiguate the framed traffic light or initiated in series. For example, if step 606 fails to disambiguate the framed traffic light, step 608 is initiated for disambiguation. Likewise, if step 608 further fails to disambiguate the framed traffic light, step 610 is initiated for disambiguation. At least one of the disambiguated outputs generated by the edge-based module, the vertex-based module, or the region of interest distance-based module at steps 606-610 is provided to a control system. At 612, a mechanical system of the autonomous vehicle is controlled based upon the at least one disambiguated output. The methodology 600 completes at 614.

Figure 7:
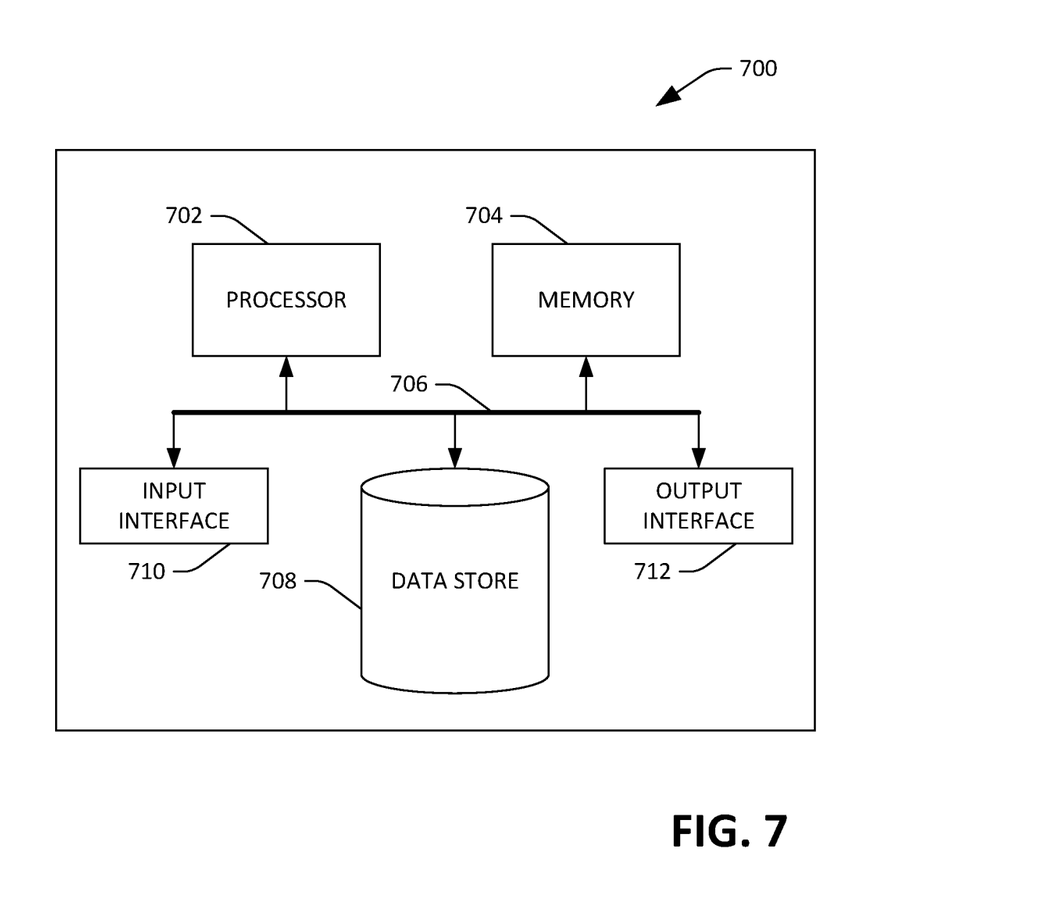
FIG. 7 illustrates an exemplary computing system.

Referring now to FIG. 7, a high-level illustration of an exemplary computing device 700 that can be used in accordance with the systems and methodologies disclosed herein is illustrated. For instance, the computing device 700 may be or include the computing system 112. The computing device 700 includes at least one processor 702 that executes instructions that are stored in a memory 704. The instructions may be, for instance, instructions for implementing functionality described as being carried out by one or more modules and systems discussed above or instructions for implementing one or more of the methods described above. In addition to storing executable instructions, the memory 704 may also store location information, distance information, direction information, etc.

The computing device 700 additionally includes a data store 708 that is accessible by the processor 702 by way of the system bus 706. The data store 708 may include executable instructions, location information, distance information, direction information, etc. The computing device 700 also includes an input interface 710 that allows external devices to communicate with the computing device 700. For instance, the input interface 710 may be used to receive instructions from an external computer device, etc. The computing device 700 also includes an output interface 712 that interfaces the computing device 700 with one or more external devices. For example, the computing device 700 may transmit control signals to the vehicle propulsion system 106, the braking system 108, and/or the steering system 110 by way of the output interface 712.

Additionally, while illustrated as a single system, it is to be understood that the computing device 700 may be a distributed system. Thus, for instance, several devices may be in communication by way of a network connection and may collectively perform tasks described as being performed by the computing device 700.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An autonomous vehicle, comprising:
    a mechanical system;
    a sensor system configured to generate a sensor signal;
    a computing system in communication with the mechanical system and the sensor system, wherein the computing system comprises:
        a processor; and
        memory that stores instructions that, when executed by the processor, cause the processor to perform acts comprising:
            defining a region of interest that frames a traffic light in the sensor signal, the region of interest being larger than the traffic light;
            detecting an illuminated bulb in the region of interest;
            disambiguating whether the illuminated bulb is part of the traffic light framed in the region of interest, wherein performance of the disambiguating of whether the illuminated bulb is part of the traffic light framed in the region of interest is triggered when the region of interest overlaps a differing region of interest that frames a differing traffic light in the sensor signal; and
            controlling the mechanical system based at least in part upon whether the illuminated bulb is part of the traffic light framed in the region of interest.

2. The autonomous vehicle of claim 1, wherein the disambiguating further comprises:
    performing a vertex-based technique when an edge-based technique does not disambiguate whether the illuminated bulb is part of the traffic light framed in the region of interest; and
    performing a region of interest distance-based technique when the vertex-based technique does not disambiguate whether the illuminated bulb is part of the traffic light framed in the region of interest.

3. The autonomous vehicle of claim 1, wherein the memory further stores instructions that, when executed by the processor, cause the processor to perform acts comprising:
    identifying a directive based on states of bulbs of the traffic light, wherein the states of the bulbs of the traffic light are based at least in part upon whether the illuminated bulb is part of the traffic light framed in the region of interest;
    wherein the mechanical system is controlled based on the directive.

4. The autonomous vehicle of claim 1, wherein the memory further stores instructions that, when executed by the processor, cause the processor to perform acts comprising:
    defining the differing region of interest that frames the differing traffic light in the sensor signal, the differing region of interest being larger than the differing traffic light;
    wherein the illuminated bulb is detected in the region of interest and the differing region of interest; and
    wherein the disambiguating whether the illuminated bulb is part of the traffic light framed in the region of interest further comprises identifying whether the illuminated bulb is part of one of:

the traffic light framed in the region of interest; or
the differing traffic light framed in the differing region of interest.

5. The autonomous vehicle of claim 4, wherein the memory further stores instructions that, when executed by the processor, cause the processor to perform acts comprising:
detecting a differing illuminated bulb, wherein the differing illuminated bulb is detected in the region of interest and the differing region of interest;
wherein the disambiguating further comprises performing an edge-based technique that includes comparing a first vector that extends from the illuminated bulb to the differing illuminated bulb with a second vector that extends from a point in the region of interest to a differing point in the differing region of interest.

6. The autonomous vehicle of claim 5, wherein the second vector extends from a center point of the region of interest to a differing center point of the differing region of interest.

7. The autonomous vehicle of claim 4, wherein the disambiguating further comprises performing a vertex-based technique that includes determining an orientation of the illuminated bulb.

8. The autonomous vehicle of claim 4, wherein the disambiguating further comprises performing a region of interest distance-based technique that includes determining a distance from the illuminated bulb to a center of the region of interest and a differing distance from the illuminated bulb to a differing center of the differing region of interest.

9. A method performed by an autonomous vehicle, the method comprising:
outputting a sensor signal;
defining a region of interest that frames a traffic light in the sensor signal, the region of interest being larger than the traffic light;
detecting an illuminated bulb in the region of interest;
disambiguating whether the illuminated bulb is part of the traffic light framed in the region of interest, wherein performance of the disambiguating of whether the illuminated bulb is part of the traffic light framed in the region of interest is triggered when the region of interest overlaps a differing region of interest that frames a differing traffic light in the sensor signal; and
controlling a mechanical system based at least in part upon whether the illuminated bulb is part of the traffic light framed in the region of interest.

10. The method of claim 9, wherein the disambiguating further comprises:
performing a vertex-based technique when an edge-based technique does not disambiguate whether the illuminated bulb is part of the traffic light framed in the region of interest; and
performing a region of interest distance-based technique when the vertex-based technique does not disambiguate whether the illuminated bulb is part of the traffic light framed in the region of interest.

11. The method of claim 9, further comprising:
identifying a directive based on states of bulbs of the traffic light, wherein the states of the bulbs of the traffic light are based at least in part upon whether the illuminated bulb is part of the traffic light framed in the region of interest;
wherein the mechanical system is controlled based on the directive.

12. The method of claim 9, further comprising:
defining the differing region of interest that frames the differing traffic light in the sensor signal, the differing region of interest being larger than the differing traffic light;
wherein the illuminated bulb is detected in the region of interest and the differing region of interest; and
wherein the disambiguating whether the illuminated bulb is part of the traffic light framed in the region of interest further comprises identifying whether the illuminated bulb is part of one of:
the traffic light framed in the region of interest; or
the differing traffic light framed in the differing region of interest.

13. The method of claim 12, further comprising:
detecting a differing illuminated bulb, wherein the differing illuminated bulb is detected in the region of interest and the differing region of interest;
wherein the disambiguating further comprises performing an edge-based technique that includes comparing a first vector extending from the illuminated bulb to the differing illuminated bulb with a second vector extending from a point in the region of interest to a differing point in the differing region of interest.

14. The method of claim 13, wherein the second vector extends from a center point of the region of interest to a differing center point of the differing region of interest.

15. The method of claim 12, wherein the disambiguating further comprises performing a vertex-based technique that includes determining an orientation of the illuminated bulb.

16. The method of claim 12, wherein the disambiguating further comprises performing a region of interest distance-based technique that includes determining a distance from the illuminated bulb to a center of the region of interest.

17. An autonomous vehicle, comprising:
a computer-readable storage medium that comprises instructions that, when executed by one or more processors, cause the one or more processors to perform actions comprising:
defining a first region of interest that frames a first traffic light in the sensor signal, the first region of interest being larger than the first traffic light;
defining a second region of interest that frames a second traffic light in the sensor signal, the second region of interest being larger than the second traffic light, the second region of interest overlaps the first region of interest;
detecting an illuminated bulb, the illuminated bulb being in the first region of interest and the second region of interest;
disambiguating whether the illuminated bulb is part of one of the first traffic light framed in the first region of interest or the second traffic light framed in the second region of interest, wherein performance of the disambiguating is triggered based on the second region of interest overlapping the first region of interest; and
controlling a mechanical system based at least in part upon whether the illuminated bulb is part of the first traffic light framed in the first region of interest or the second traffic light framed in the second region of interest.

18. The autonomous vehicle of claim 17, wherein the disambiguating further comprises performing at least one of an edge-based technique, a vertex-based technique, or a region of interest distance-based technique.

19. The autonomous vehicle of claim 17, wherein the computer-readable storage medium further comprises instructions that, when executed by the one or more processors, cause the one or more processors to perform actions comprising:
    identifying a directive based on at least one of:
        states of bulbs of the first traffic light, wherein the states of the bulbs of the first traffic light are based at least in part upon whether the illuminated bulb is part of the first traffic light framed in the first region of interest; or
        states of bulbs of the second traffic light, wherein the states of the bulbs of the second traffic light are based at least in part upon whether the illuminated bulb is part of the second traffic light framed in the second region of interest;
    wherein the mechanical system is controlled based on the directive.

20. The autonomous vehicle of claim 17, wherein the disambiguating further comprises:
    performing a vertex-based technique when an edge-based technique does not disambiguate whether the illuminated bulb is part of the first traffic light framed in the first region of interest or the second traffic light framed in the second region of interest; and
    performing a region of interest distance-based technique when the vertex-based technique does not disambiguate whether the illuminated bulb is part of the first traffic light framed in the first region of interest or the second traffic light framed in the second region of interest.

\* \* \* \* \*